US009639502B1

(12) United States Patent
Kumar et al.

(10) Patent No.: US 9,639,502 B1
(45) Date of Patent: May 2, 2017

(54) TECHNIQUES FOR MANAGING COMPUTING RESOURCES

(71) Applicant: Veritas Technologies LLC, Mountain View, CA (US)

(72) Inventors: Praween Kumar, Pune (IN); Amol Katkar, Maharashtra (IN)

(73) Assignee: Veritas Technologies LLC, Mountain View, CA (US)

( * ) Notice: Subject to any disclaimer, the term of this patent is extended or adjusted under 35 U.S.C. 154(b) by 290 days.

(21) Appl. No.: 13/743,156

(22) Filed: Jan. 16, 2013

(51) Int. Cl.
 G06F 15/177 (2006.01)
 H04L 29/06 (2006.01)
 H04L 12/24 (2006.01)
 G06F 9/455 (2006.01)
 G06F 9/50 (2006.01)

(52) U.S. Cl.
 CPC ........ *G06F 15/177* (2013.01); *G06F 9/45533* (2013.01); *G06F 9/45558* (2013.01); *G06F 9/5077* (2013.01); *H04L 41/0803* (2013.01); *H04L 41/0806* (2013.01); *H04L 41/0813* (2013.01); *H04L 41/0893* (2013.01); *H04L 63/10* (2013.01)

(58) Field of Classification Search
 CPC ............. H04L 41/0803; H04L 41/0806; H04L 41/0893; H04L 41/0813; H04L 63/10; G06F 9/45558; G06F 9/45533; G06F 9/5077
 USPC ....... 709/203, 217, 219, 220, 223, 224, 226; 718/1, 104
 See application file for complete search history.

(56) References Cited

U.S. PATENT DOCUMENTS

| 8,468,535 | B1* | 6/2013 | Keagy et al. ................. 718/104 |
| 8,635,613 | B1* | 1/2014 | Vargas et al. ..................... 718/1 |
| 2006/0143617 | A1* | 6/2006 | Knauerhase ............. G06F 9/50 8/104 |
| 2006/0155708 | A1* | 7/2006 | Brown et al. .................... 707/10 |
| 2007/0234302 | A1* | 10/2007 | Suzuki et al. ................ 717/126 |
| 2009/0282404 | A1* | 11/2009 | Khandekar et al. .............. 718/1 |
| 2010/0186010 | A1* | 7/2010 | Chalemin ............. G06F 9/5077 718/1 |
| 2010/0293269 | A1* | 11/2010 | Wilson et al. ................. 709/224 |
| 2011/0142053 | A1* | 6/2011 | Van Der Merwe et al. .......................... 370/395.1 |
| 2011/0161482 | A1* | 6/2011 | Bonola ................. G06F 9/5077 709/223 |
| 2011/0173302 | A1* | 7/2011 | Rider .................. G06F 9/44505 709/220 |
| 2012/0131193 | A1* | 5/2012 | Ferris .................... G06F 9/5072 709/226 |
| 2012/0272234 | A1* | 10/2012 | Kaiser ................. G06F 11/3442 718/1 |

(Continued)

*Primary Examiner* — Liangche A Wang
*Assistant Examiner* — Johnny Aguiar
(74) *Attorney, Agent, or Firm* — Wilmer Cutler Pickering Hale and Dorr LLP

(57) ABSTRACT

Techniques for managing computing resources are disclosed. In one particular embodiment, the techniques may be realized as a method for managing computing resources including receiving a desired resource configuration, determining currently available resources, determining, via at least one computer processor, whether the currently available resources satisfy the desired resource configuration, and determining a resource implementation based on the determination of whether the currently available resources satisfy the desired resource configuration.

17 Claims, 6 Drawing Sheets

(56) References Cited

U.S. PATENT DOCUMENTS

| | | | |
|---|---|---|---|
| 2013/0031559 A1* | 1/2013 | Alicherry | G06F 9/5077 718/104 |
| 2013/0073713 A1* | 3/2013 | Stelmar Netto | 709/224 |
| 2013/0111468 A1* | 5/2013 | Davis et al. | 718/1 |
| 2014/0101655 A1* | 4/2014 | Brant et al. | 718/1 |
| 2014/0189685 A1* | 7/2014 | Kripalani | 718/1 |

* cited by examiner

TECHNIQUES FOR MANAGING COMPUTING RESOURCES

FIELD OF THE DISCLOSURE

The present disclosure relates generally to managing virtual machine states and, more particularly, to techniques for managing computing resources.

BACKGROUND OF THE DISCLOSURE

Virtual machines provide increased flexibility and functionality for computing resources in a clustered computing environment. However, conventional virtual machine management requires that a user or an administrator specify the states for particular virtual machines by, for example, specifying which virtual machines are to start or be online and which virtual machines are to stop or be offline. This is very time consuming and difficult for a user or an administrator as the virtual machines may be spread across multiple nodes in a clustered computing environment, the virtual machine resources may change over time, and the desired virtual machine implementation configuration may change over time. In view of the foregoing, it may be understood that there may be significant problems and shortcomings associated with traditional virtual machine management technologies.

SUMMARY OF THE DISCLOSURE

Techniques for managing computing resources are disclosed. In one particular embodiment, the techniques may be realized as a method for managing computing resources comprising: receiving a desired resource configuration; determining currently available resources; determining, via at least one computer processor, whether the currently available resources satisfy the desired resource configuration; and determining a resource implementation based on the determination of whether the currently available resources satisfy the desired resource configuration.

In accordance with other aspects of this particular embodiment, the method further comprises implementing the determined resource implementation.

In accordance with other aspects of this particular embodiment, the method further comprises notifying a user when it is determined that the currently available resources do not satisfy the desired resource configuration.

In accordance with other aspects of this particular embodiment, the method further comprises monitoring the currently available resources to determine whether the currently available resources have changed.

In accordance with other aspects of this particular embodiment, the method further comprises identifying which specific resources have changed when it has been determined that the currently available resources have changed; and determining whether the changed resources satisfy the desired resource configuration.

In accordance with other aspects of this particular embodiment, the method further comprises notifying a user when it is determined that the changed resources do not satisfy the desired resource configuration.

In accordance with further aspects of this particular embodiment, the desired resource configuration is specified by a user via a user interface.

In accordance with other aspects of this particular embodiment, the method further comprises determining whether an updated resource configuration has been received; and determining whether the currently available resources satisfy the updated resource configuration when it has been determined that the updated resource configuration has been received.

In accordance with other aspects of this particular embodiment, the method further comprises notifying a user when it is determined that the currently available resources do not satisfy the updated resource configuration.

In accordance with other aspects of this particular embodiment, the method further comprises determining an updated resource implementation to satisfy the updated resource configuration.

In accordance with other aspects of this particular embodiment, the currently available resources include at least one virtual machine.

In accordance with additional aspects of this particular embodiment, the currently available resources include a plurality of virtual machines arranged at a plurality of computing nodes.

In accordance with additional aspects of this particular embodiment, each of the plurality of virtual machines are within one of a plurality of service groups and a plurality of applications are implemented across the plurality of virtual machines In accordance with additional aspects of this particular embodiment, the desired resource configuration includes predicate logic.

In accordance with additional aspects of this particular embodiment, the predicate logic includes a plurality of Boolean conditions.

In accordance with additional aspects of this particular embodiment, the Boolean conditions include at least one of: and, or, nor, xor, greater than, and less than.

In accordance with additional aspects of this particular embodiment, the predicate logic indicates a desired first state for a first plurality of resources and a desired second state for a second plurality of resources.

In accordance with additional aspects of this particular embodiment, desired first state is online, the first plurality of resources are within a first computing node, the desired second state is online, and the second plurality of resources are within a second computing node different from the first computing node.

In another particular embodiment, the technique may be realized as a at least one non-transitory processor readable storage medium storing a computer program of instructions configured to be readable by at least one processor for instructing the at least one processor to execute a computer process for performing a method for managing computing resources comprising: receiving a desired resource configuration; determining currently available resources; determining, via at least one computer processor, whether the currently available resources satisfy the desired resource configuration; and determining a resource implementation based on the determination of whether the currently available resources satisfy the desired resource configuration.

In another particular embodiment, the technique may be realized as a system for managing computing resources comprising: one or more processors communicatively coupled to a network; wherein the one or more processors are configured to: receive a desired resource configuration; determine currently available resources; determine whether the currently available resources satisfy the desired resource configuration; and determine a resource implementation based on the determination of whether the currently available resources satisfy the desired resource configuration.

The present disclosure will now be described in more detail with reference to particular embodiments thereof as shown in the accompanying drawings. While the present disclosure is described below with reference to particular embodiments, it should be understood that the present disclosure is not limited thereto. Those of ordinary skill in the art having access to the teachings herein will recognize additional implementations, modifications, and embodiments, as well as other fields of use, which are within the scope of the present disclosure as described herein, and with respect to which the present disclosure may be of significant utility.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be illustrative only.

DETAILED DESCRIPTION OF EMBODIMENTS

Figure 1:
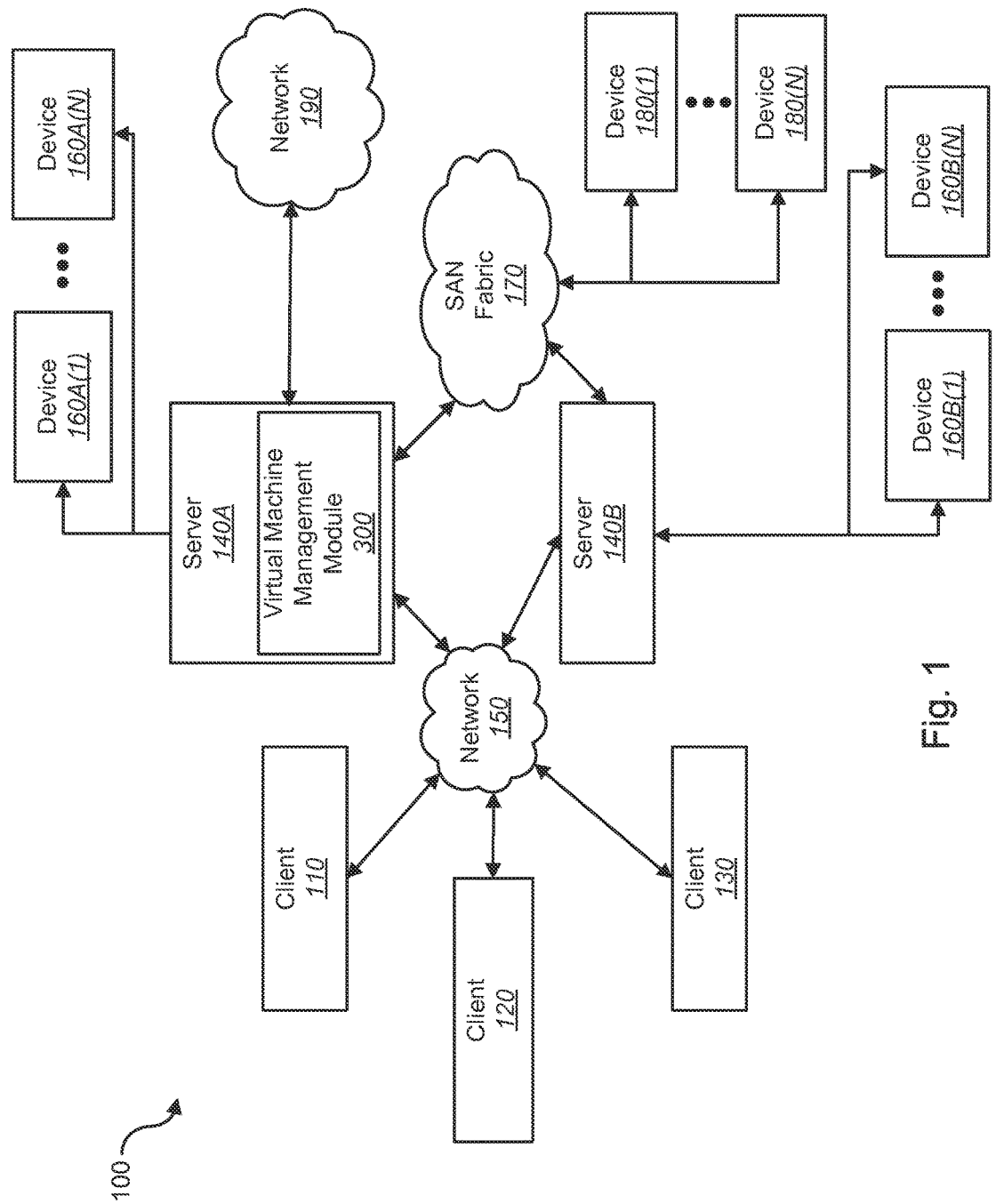
FIG. 1 shows a block diagram depicting a network architecture in accordance with an embodiment of the present disclosure.

FIG. 1 shows a block diagram depicting a network architecture for virtual machine management in accordance with an embodiment of the present disclosure.

FIG. 1 is a simplified view of network architecture 100, which may include additional elements that are not depicted. Network architecture 100 may contain client systems 110, 120 and 130, as well as servers 140A-140N (one or more of each of which may be implemented using computer system 200 shown in FIG. 2). Client systems 110, 120 and 130 may be communicatively coupled to a network 150. Server 140A may be communicatively coupled to storage devices 160A(1)-(N), and server 140N may be communicatively coupled to storage devices 160N(1)-(N). Servers 140A-140N may contain a management module (e.g., virtual machine management module 300). Servers 140A-140N may be communicatively coupled to a SAN (Storage Area Network) fabric 170. SAN fabric 170 may support access to storage devices 180(1)-(N) by servers 140A-140N, and by client systems 110, 120 and 130 via network 150.

Figure 2:
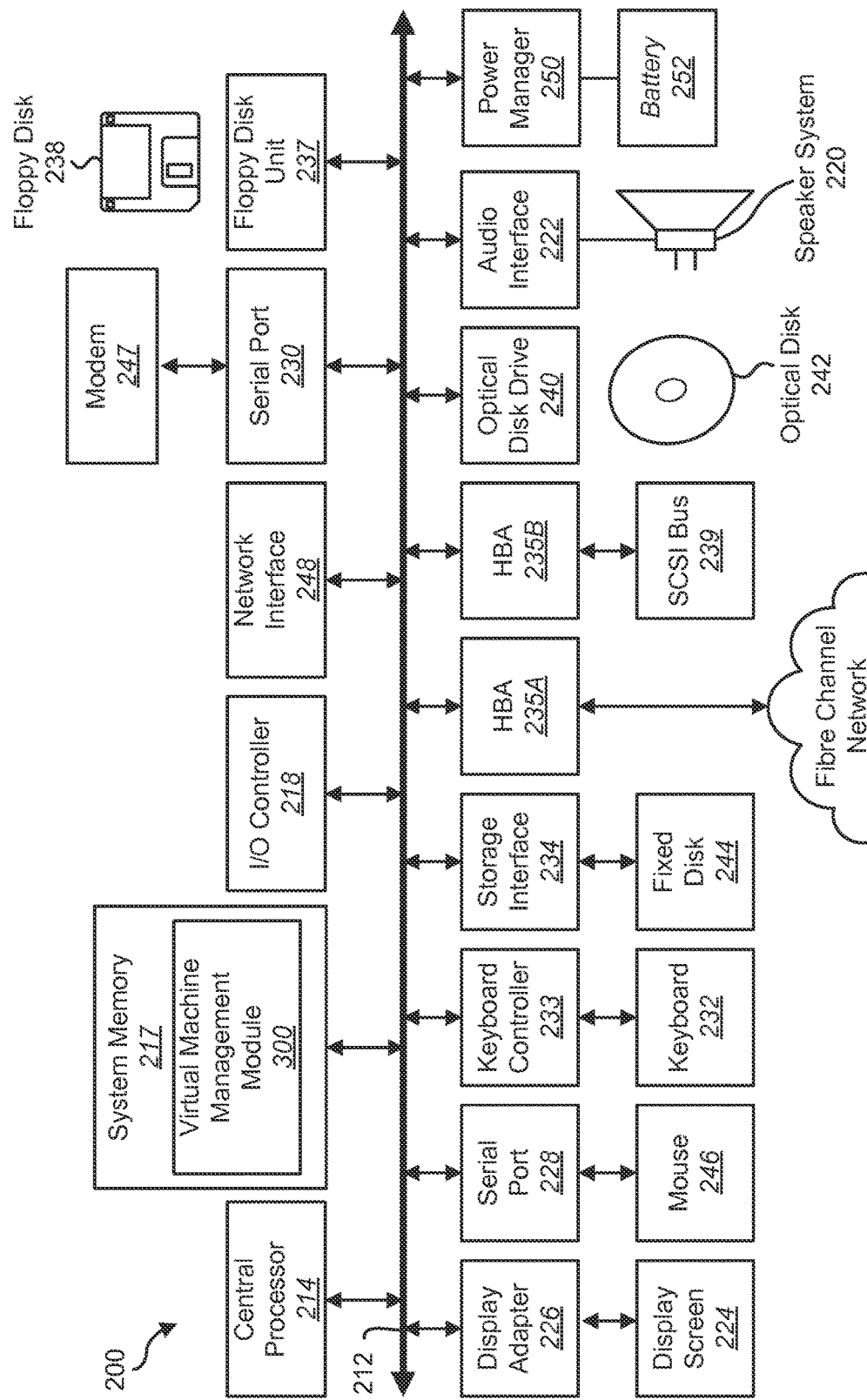
FIG. 2 shows a block diagram depicting a computer system in accordance with an embodiment of the present disclosure.

With reference to computer system 200 of FIG. 2, modem 247, network interface 248, or some other method may be used to provide connectivity from one or more of client systems 110, 120 and 130 to network 150. Client systems 110, 120 and 130 may access information on server 140A-140N using, for example, a web browser or other client software (not shown). Such a client may allow client systems 110, 120 and 130 to access data hosted by any one of servers 140A-140N or one of storage devices 160A(1)-(N), 160N(1)-(N), and/or 180(1)-(N).

Networks 150 and 190 may be local area networks (LANs), wide area networks (WANs), the Internet, cellular networks, satellite networks, or other networks that permit communication between clients 110, 120, 130, servers 140, and other devices communicatively coupled to networks 150 and 190. Networks 150 and 190 may further include one, or any number, of the exemplary types of networks mentioned above operating as a stand-alone network or in cooperation with each other. Networks 150 and 190 may utilize one or more protocols of one or more clients or servers to which they are communicatively coupled. Networks 150 and 190 may translate to or from other protocols to one or more protocols of network devices. Although networks 150 and 190 are each depicted as one network, it should be appreciated that according to one or more embodiments, networks 150 and 190 may each comprise a plurality of interconnected networks.

Storage devices 160A(1)-(N), 160N(1)-(N), and/or 180(1)-(N) may be network accessible storage and may be local, remote, or a combination thereof to any one of servers 140A-140N. Storage devices 160A(1)-(N), 160N(1)-(N), and/or 180(1)-(N) may utilize a redundant array of inexpensive disks ("RAID"), magnetic tape, disk, a storage area network ("SAN"), an internet small computer systems interface ("iSCSI") SAN, a Fibre Channel SAN, a common Internet File System ("CIFS"), network attached storage ("NAS"), a network file system ("NFS"), optical based storage, or other computer accessible storage. Storage devices 160A(1)-(N), 160N(1)-(N), and/or 180(1)-(N) may be used for backup or archival purposes. For example, storage devices 160N(1)-(N) and/or 180(1)-(N) may be used to store data replicated from storage devices 160A(1)-(N).

According to some embodiments, clients 110, 120, and 130 may be smartphones, PDAs, desktop computers, laptop computers, servers, other computers or computing devices, or other devices coupled via a wireless or wired connection to network 150. Clients 110, 120, and 130 may receive data from user input, a database, a file, a web service, and/or an application programming interface.

Servers 140A-140N may be application servers, archival platforms, backup servers, network storage devices, media servers, email servers, document management platforms, enterprise search servers, or other devices communicatively coupled to network 150. Servers 140A-140N may utilize one of storage devices 160A(1)-(N), 160N(1)-(N), and/or 180(1)-(N) for the storage of application data, backup data, or other data. Servers 140A-140N may be hosts, such as an application server, which may process data traveling between clients 110, 120, and 130 and a backup platform, a backup process, and/or storage. According to some embodiments, servers 140A-140N may be platforms used for backing up and/or archiving data. One or more portions of data may be backed up or archived based on a backup policy and/or an archive applied, attributes associated with the data source, space available for backup, space available at the data source, or other factors.

A plurality of virtual machines may be implemented across servers 140A-140N. Each server 140A-140N, client 110-130, or device 160A-160N, 180A-180N, may function as a node within a clustered computing environment. Multiple engine processes may run across the nodes to support various applications including for example, a web application. The applications may be grouped within different service groups that each include at least one virtual machine. The virtual machines within a first service group may be dependent upon a second service group and each service group may support the varying applications. Further, the applications may be spread across multiple virtual machines running on multiple nodes within different service groups. The virtual machines may be managed according to Veritas Business Service from Symantec Corporation. Further, the clustering configuration may be implemented by the Vertias Cluster Server from Symantec Corporation.

According to some embodiments, server 140A may contain one or more portions of software for virtual machine management such as, for example, virtual machine management module 300. As illustrated, one or more portions of the virtual machine management module 300 may reside at a network centric location. For example, server 140A may be a server, a firewall, a gateway, or other network element that may perform one or more actions to manage virtual machines. According to some embodiments, network 190 may be an external network (e.g., the Internet) and server 140A may be a gateway or firewall between one or more internal components and clients and the external network. According to some embodiments, virtual machine management module 300 may be implemented as part of a cloud computing environment.

FIG. 2 shows a block diagram of a computer system 200 in accordance with an embodiment of the present disclosure. Computer system 200 is suitable for implementing techniques in accordance with the present disclosure. Computer system 200 may include a bus 212 which may interconnect major subsystems of computer system 200, such as a central processor 214, a system memory 217 (e.g. RAM (Random Access Memory), ROM (Read Only Memory), flash RAM, or the like), an Input/Output (I/O) controller 218, an external audio device, such as a speaker system 220 via an audio output interface 222, an external device, such as a display screen 224 via display adapter 226, serial ports 228 and 230, a keyboard 232 (interfaced via a keyboard controller 233), a storage interface 234, a floppy disk drive 237 operative to receive a floppy disk 238, a host bus adapter (HBA) interface card 235A operative to connect with a Fibre Channel network 290, a host bus adapter (HBA) interface card 235B operative to connect to a SCSI bus 239, and an optical disk drive 240 operative to receive an optical disk 242. Also included may be a mouse 246 (or other point-and-click device, coupled to bus 212 via serial port 228), a modem 247 (coupled to bus 212 via serial port 230), network interface 248 (coupled directly to bus 212), power manager 250, and battery 252.

Bus 212 allows data communication between central processor 214 and system memory 217, which may include read-only memory (ROM) or flash memory (neither shown), and random access memory (RAM) (not shown), as previously noted. The RAM may be the main memory into which the operating system and application programs may be loaded. The ROM or flash memory can contain, among other code, the Basic Input-Output system (BIOS) which controls basic hardware operation such as the interaction with peripheral components. Applications resident with computer system 200 may be stored on and accessed via a computer readable medium, such as a hard disk drive (e.g., fixed disk 244), an optical drive (e.g., optical drive 240), a floppy disk unit 237, a removable disk unit (e.g., Universal Serial Bus drive), or other storage medium. According to some embodiments, virtual machine management module 300 may be resident in system memory 217.

Storage interface 234, as with the other storage interfaces of computer system 200, can connect to a standard computer readable medium for storage and/or retrieval of information, such as a fixed disk drive 244. Fixed disk drive 244 may be a part of computer system 200 or may be separate and accessed through other interface systems. Modem 247 may provide a direct connection to a remote server via a telephone link or to the Internet via an internet service provider (ISP). Network interface 248 may provide a direct connection to a remote server via a direct network link to the Internet via a POP (point of presence). Network interface 248 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 2 need not be present to practice the present disclosure. The devices and subsystems can be interconnected in different ways from that shown in FIG. 2. Code to implement the present disclosure may be stored in computer-readable storage media such as one or more of system memory 217, fixed disk 244, optical disk 242, or floppy disk 238. Code to implement the present disclosure may also be received via one or more interfaces and stored in memory. The operating system provided on computer system 200 may be MS-DOS®, MS-WINDOWS®, OS/2®, OS X®, UNIX®, Linux®, or another known operating system.

Power manager 250 may monitor a power level of battery 252. Power manager 250 may provide one or more APIs (Application Programming Interfaces) to allow determination of a power level, of a time window remaining prior to shutdown of computer system 200, a power consumption rate, an indicator of whether computer system is on mains (e.g., AC Power) or battery power, and other power related information. According to some embodiments, APIs of power manager 250 may be accessible remotely (e.g., accessible to a remote backup management module via a network connection). According to some embodiments, battery 252 may be an Uninterruptable Power Supply (UPS) located either local to or remote from computer system 200. In such embodiments, power manager 250 may provide information about a power level of an UPS.

The description below describes network elements, computers, and/or components of a system and method for virtual machine management that may include one or more modules. As used herein, the term "module" may be understood to refer to computing software, firmware, hardware, and/or various combinations thereof. Modules, however, are not to be interpreted as software which is not implemented on hardware, firmware, or recorded on a processor readable recordable storage medium (i.e., modules are not software per se). It is noted that the modules are exemplary. The modules may be combined, integrated, separated, and/or duplicated to support various applications. Also, a function described herein as being performed at a particular module may be performed at one or more other modules and/or by one or more other devices instead of or in addition to the function performed at the particular module. Further, the modules may be implemented across multiple devices and/or other components local or remote to one another. Additionally, the modules may be moved from one device and added to another device, and/or may be included in both devices.

Figure 3:
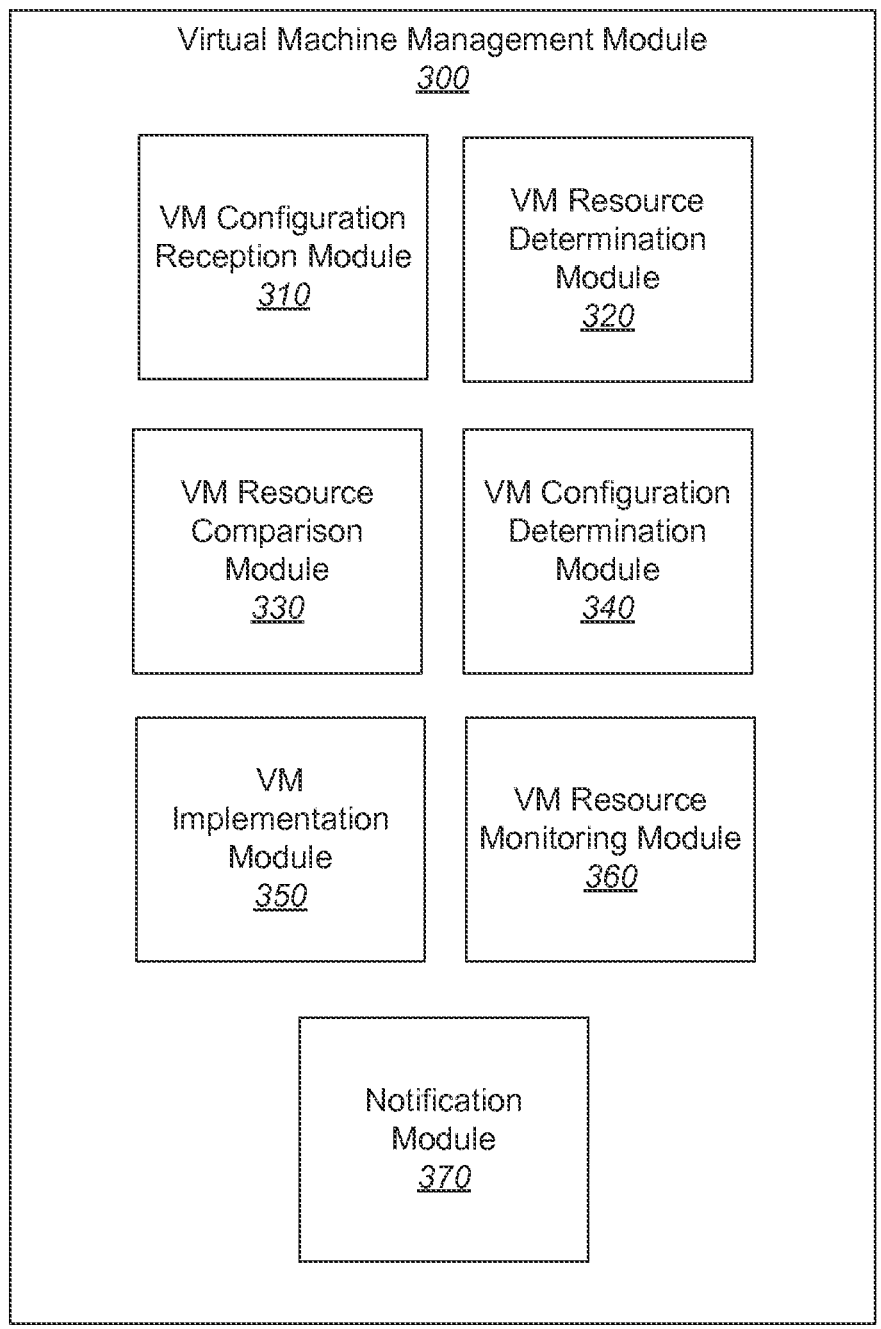
FIG. 3 shows a virtual machine management module in accordance with an embodiment of the present disclosure.

FIG. 3 shows a virtual machine management module 300 in accordance with an embodiment of the present disclosure. As illustrated, the virtual machine management module 300 may contain one or more components including a virtual machine ("VM") configuration reception module 310, a VM resource determination module 320, a VM resource comparison module 330, a VM configuration determination module 340, a VM implementation module 350, a VM resource monitoring module 360, and a notification module 370.

The VM configuration reception module 310 may receive a desired virtual machine management configuration from a user or an administrator. The desired configuration may be received via a graphical user interface or any other appreciate input device. The received virtual machine management configuration may then be passed to a virtual machine management daemon. For example, the daemon may be a VBS daemon that receives the user specific virtual machine configuration. The desired configuration may specify when particular virtual machine resources are to start or stop. In addition, the desired configuration may specify a particular set of resources to bring online or states for the resources. Further, the desired configuration may utilize predicate logic to specify the desired virtual machine resource configuration using various Boolean conditions. The Boolean conditions may include AND, OR, NOR, XOR, greater than, less than, at least, etc. Accordingly, the user or administrator may set a wide variety configurations that do not require the identification of particular virtual machines for particular nodes.

The VM resource determination module 320 may determine the physical and virtual machine resources currently available within a clustered computing environment. For example, the VM resource determination module 320 may determine which virtual machines are currently available across multiple nodes, which applications are supported by the virtual machines, the service groups, and the interdependency between the service groups. The VM resource determination module 320 may determine the available resources in any of a plurality of ways. For example, the VM resource determination module 320 may broadcast a request for a response indicating the availability of the resources. In some embodiments, the resources within the computing environment may periodically report their respective availability to the VM resource determination module 320.

The VM resource comparison module 330 may compare the virtual and/or physical machine resources determined to be currently available by the VM resource determination module 320 with the desired virtual, or physical, machine management configuration received by the VM configuration reception module 310. In some embodiments, the VM resource comparison module 330 may compare each of the elements specified in the virtual machine management configuration with the determined available computing resources. For example, the VM resource comparison module 330 may directly compare the nodes, the service groups, the applications, the clusters, and any other specified aspects of the configuration. In addition, the VM resource comparison module 330 may determine whether the currently available resources may satisfy the Boolean conditions specified in the predicate logic of the desired configuration. In one example, the VM resource comparison module 330 may determine whether the conditions of N number of virtual machines on Node A "AND" M number of virtual machines on Node B specified in the desired configuration are satisfied by the currently available resources. The VM resource comparison module 330 may compare the currently available resources with any additional Boolean conditions or specific conditions included in the desired configuration.

The VM configuration determination module 340 may determine which virtual machine resources to utilize or implement to satisfy the desired virtual machine management configuration specified by the user via the VM configuration reception module 310 based on the results of the comparison from the VM resource comparison module 330. For example, the VM configuration determination module 340 may determine the particular resources (i.e., server, cluster, node, virtual machine, service group, application, etc.) to be implemented to satisfy the desired configuration. In some instances, the VM resource comparison module 330 may identify multiple resources that may satisfy the desired conditions. As a result, the VM configuration determination module 340 may select from the multiple resources that satisfy the desired configuration the particular resources to be implemented and the states (i.e., online, offline, etc.) for those resources.

The VM implementation module 350 may then implement the resource configuration determined by the VM configuration determination module 340. In some embodiments, the VM implementation module 350 may transmit a command to the specified resources to bring those resources to the selected state. For example, the VM implementation module 350 may transmit a command to a first plurality of virtual machines across multiple nodes to start or bring those resources online and another command to a second plurality of virtual machines to stop or bring a second set of nodes offline. The VM implementation module 350 may confirm whether the requested resources are brought to their proper states following the transmission on the commands. In one embodiment, the resources may report their states when they change to the virtual machine management module 300.

The VM resource monitoring module 360 may monitor the resources within the computing environment to determine the availability of the resources and any change in the availability of resources. In addition, the VM resource monitoring module 360 may monitor the resources within the computing environment to determine the current states (start, stop, etc.) of the resources. The VM resource monitoring module 360 may monitor the physical and virtual machine resources determined to be currently available by the VM resource determination module 320. In addition, the VM resource monitoring module 360 may monitor any additional physical and virtual machine resources within the clustered computing environment that may not be identified by the VM resource determination module 320. The VM resource monitoring module 360 may determine the availability and states of the resources periodically or upon the occurrence of a particular event. For example, the VM resource monitoring module 360 may determine the availability and states of all of the resources upon a change of the desired configuration, a change of the availability of a currently utilized resource, or any other event.

The notification module 370 may present information regarding the management of the at least one virtual machine. For example, the notification module 370 may present this information to a user via a graphical user interface on a display or in any other appropriate mechanism.

Figure 4:
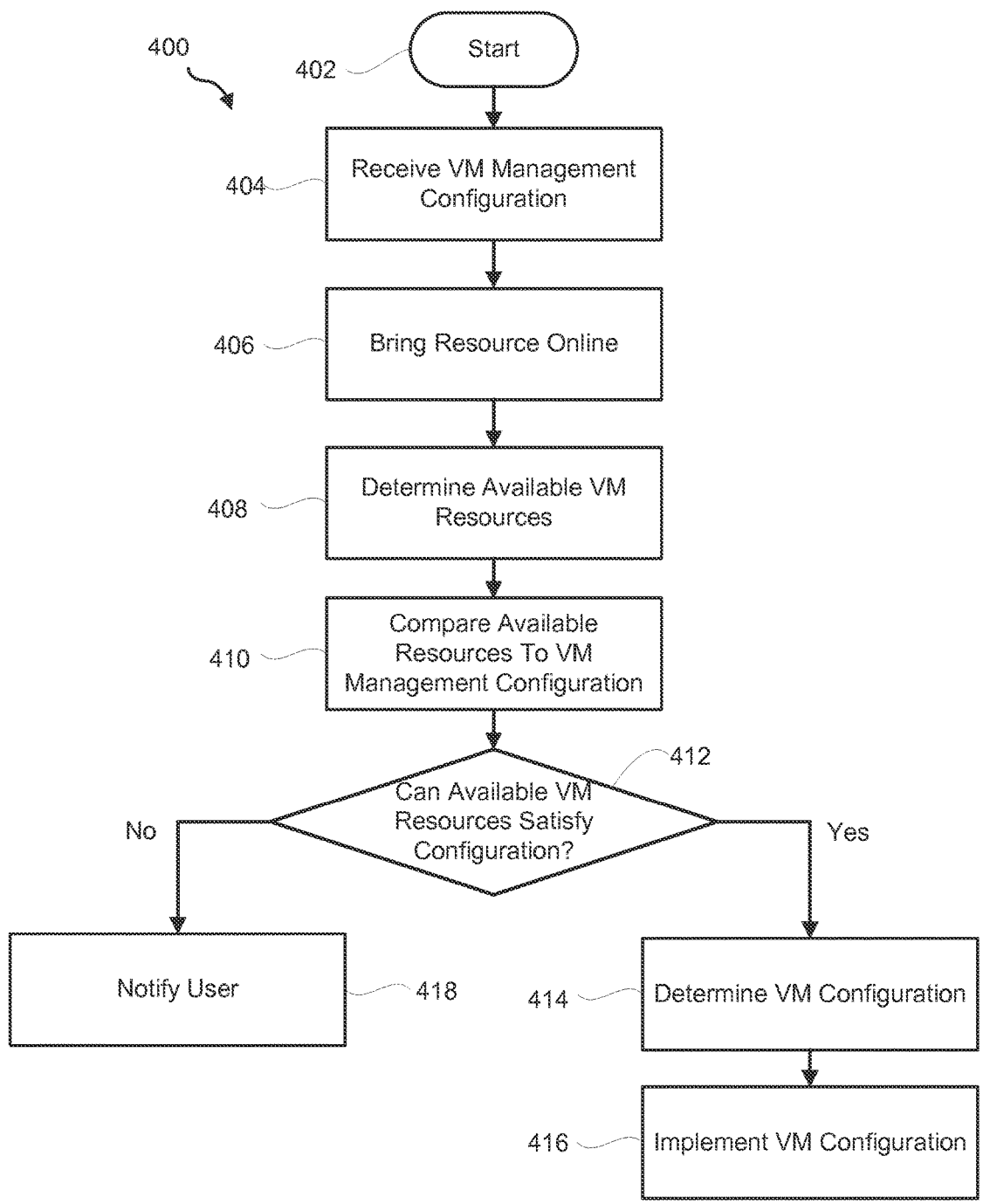
FIG. 4 shows a method for managing virtual machines in accordance with an embodiment of the present disclosure.

FIG. 4 shows a method 400 for managing virtual machines in accordance with an embodiment of the present disclosure. At block 402, the method 400 may begin.

At block 404, a desired virtual machine management configuration may be received. The desired configuration may be received from a user or administrator. In some embodiments, the desired virtual machine management configuration may be received via the VM management configuration reception module 310. The desired virtual machine configuration may specify the desired states of virtual machines using predicate logic. In addition, the configuration may specify the states of the virtual machines spread across multiple nodes and service groups supporting various applications. For example, the configuration may specify whether a certain number of first virtual machines are to start, be online, or be up on a first node when a specified number of second virtual machines are to be on a second node without specifying the particular states for particular resources. The configuration may also specify when to stop or bring offline certain virtual machines on the various nodes.

Furthermore, the configuration may specify an arbitrary predicate logic to manage the states of the virtual machines spread across the nodes which support the various applications. The predicate logic may include any one of a variety of Boolean conditions (e.g., AND, OR, NOR, XOR, etc.). For example, the configuration may specify that n number of virtual machines on a first node must be up "OR" n−1 virtual machines on a second node must be up/online. Additionally, the configuration may specify that n number of virtual machines on a first node "AND" m number of virtual machines on a second node must be up "OR" x number virtual machines on a third node must be up/online. It will be understood that a user may specify varying configurations of the virtual machines based on any combination of Boolean conditions. Further, by utilizing the arbitrary predicate logic, it is not necessary for a user to specify the desired states for particular resources but rather general requirements. Additionally, the desired configuration could specify physical machines to be utilized in conjunction with the predicate logic. Further, the desired configuration could specify applications and resources within the machines.

At block 406, the resources may be brought online. In some embodiments, additional operations may be performed on the resources. The process may then proceed to block 408.

At block 408, the currently available virtual machine resources may be determined. In some embodiments, the currently available virtual machine resources may be determined by the VM resource determination module 320. For example, the VM resource determination module 320 may determine which physical resources are online or available, which nodes are online or available, which virtual machines are online or available, the service group configuration within the nodes, the engine processes running on the nodes, and the applications being executed by the virtual machines. Additionally, the currently available physical machines within the clustered environment may be determined independent of a virtual machine configuration. The process may then proceed to block 410.

At block 410, the currently available virtual machine resources determined at block 408 are compared to the VM management configuration received at block 404. In some embodiments, the VM resource comparison module 330 may compare the currently available virtual machine resources determined at block 408 to the VM management configuration received at block 404. For example, the number of virtual machines desired may be compared to the number of virtual machines available. In addition, further aspects of the available virtual machines in the clustered environment (e.g., node, service group, application, etc.) may be compared to the desired configuration. Further, the available physical machines in the clustered environment may be determined. The process may then proceed to block 412.

At block 412, it may be determined whether the currently available virtual machine resources determined at block 408 satisfy the VM management configuration received at block 404 based on the comparison at block 410. In some embodiments, the VM resource comparison module 330 further determine whether the currently available virtual machine resources satisfy the VM management configuration. For example, it may be determined if the number of currently available virtual machines satisfies the desired number of virtual machines. Further, when the desired configuration specifies physical machines instead of virtual machines, the currently available physical machines may be compared to the desired configuration. Additionally, when the received VM management configuration specifies a predicate logic, it may be determined if the Boolean conditions specified in the predicate logic may be satisfied by the currently available virtual machines or currently available physical machines.

In one embodiment, the predicate logic for the desired configuration may specify n number of virtual machines on node A within cluster 1 "AND" m number of virtual machines on node B within cluster 1. In addition, the predicate logic may specify preferable resources. In this instance, it may be determined at block 412 whether the currently available virtual machine resources may satisfy these conditions. If it is determined that the currently available virtual machine resources do not satisfy the desired confirmation then it may be determined whether a different set of machines may satisfy the specified configuration. Further, if it is determined that the currently available virtual machine resources determined at block 408 do not satisfy the desired configuration received at block 404 then the process may proceed to block 418

At block 418, the user may be notified that the currently available virtual machine resources do not satisfy the desired configuration via the notification module 370. Upon notification that the currently available virtual machine resources do not satisfy the desired VM management configuration, a user or administrator may then specify an alternate configuration using different predicate logic or may specify a particular configuration. Additionally, the user or administrator may modify the underlying virtual machine resources by specifying a different set of machines to satisfy the desired configuration.

If it is determined that the currently available virtual machine resources determined at block 408 do satisfy the desired VM management configuration received at block 404 then the process may proceed to block 414. At block 414, the specific virtual machine resources within the available virtual machines needed to satisfy the desired configuration are identified. In some embodiments, the specific virtual machine resources and the configuration of the specific virtual machine resources may be determined by the VM configuration determination module 340. For example, the VM configuration determination module 340 may determine that to satisfy the desired configuration, VM1, VM2, VM3, and VM4 within cluster C1 and VM5, VM6, and VM7 within cluster C2 on NODE-A "AND" VM8, VM9, VM10, and VM11 on NODE-B are to be brought online or up. After the specific virtual machine resources and the configuration of the resources are determined, the process proceeds to block 416. Additionally, when the desired configuration specifies physical machine resources, the particular physical machine resources necessary to satisfy the desired configuration, including the predicate logic, may be identified.

At block 416, the virtual machine configuration, including the specific virtual machine resources, determined at block 414 may be implemented. In some embodiments, the VM implementation module 350 may implement the determined virtual machine configuration. For example, the VM implementation module 350 may transmit to each of the specific virtual machines identified at block 414 a command to start/bring online. The commands may be transmitted over a network to each of the appropriate nodes and virtual machines. Additionally, when the desired resources are physical machines, a command to bring the specified physical machines may be transmitted. It will be understood to those skilled in the art the specific content of the command to bring online the specific resources.

Figure 5:
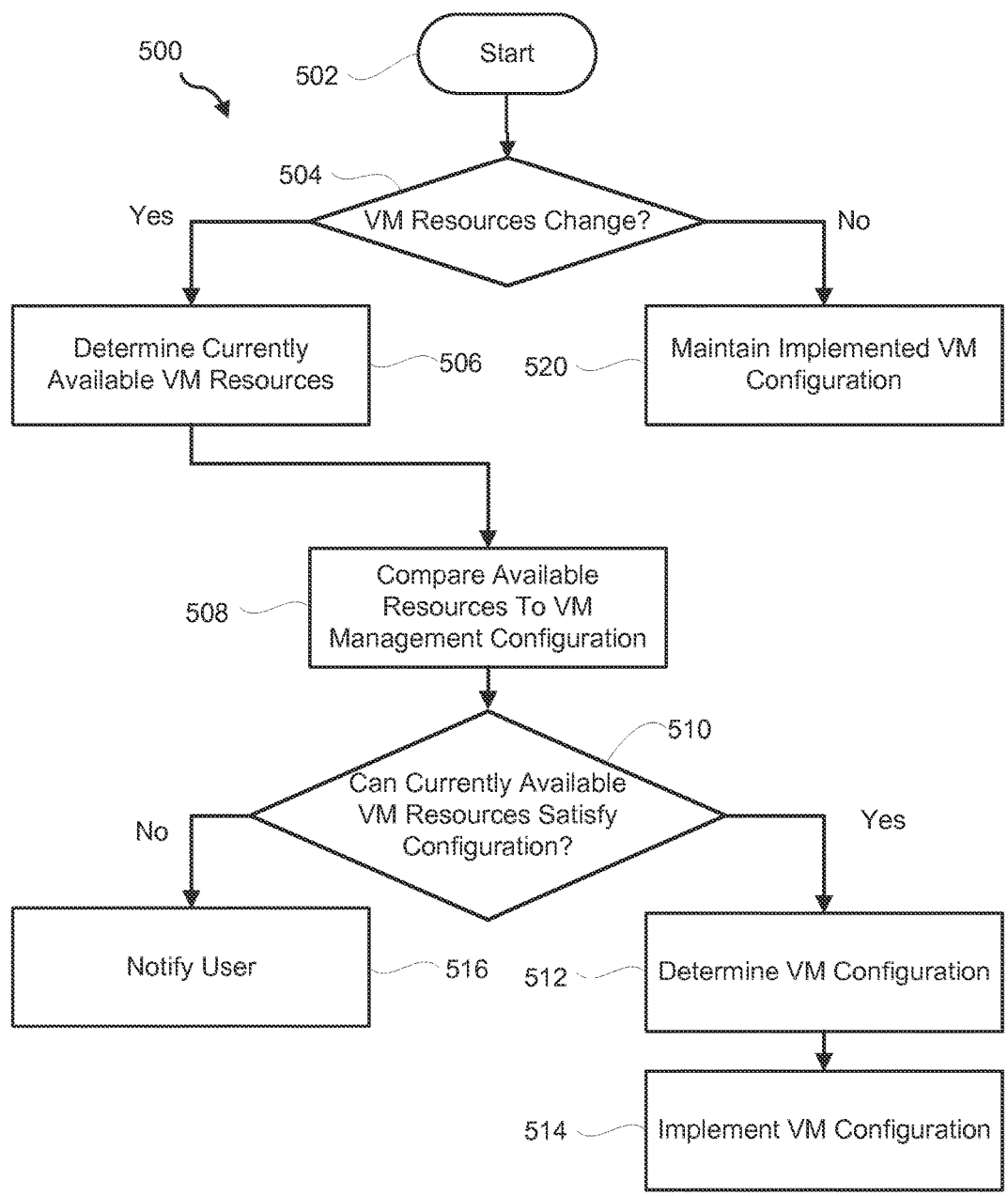
FIG. 5 shows a method for managing virtual machines when virtual machine resources change in accordance with an embodiment of the present disclosure.

FIG. 5 shows a method 500 for managing virtual machines when virtual machine resources change in accordance with an embodiment of the present disclosure. At block 502, the method 500 may begin.

At block 504, it may be determined whether the currently available VM resources have changed. In some embodiments, the VM resource monitoring module 360 may determine whether the resources have changed. The VM resource monitoring module 360 may periodically determine or continuously monitor the virtual machine resources that are currently available. Additionally, the VM resource monitoring module 360 may determine the virtual machine resources that are currently available when requested by a user or administrator. In some embodiments, the VM resource monitoring module 360 may transmit a status request to each of the virtual machine resources and determine the available resources based on a response from the virtual machines. The VM resource monitoring module 360 may then compare the newly determined resources with the resources previously determined to be available. If it is determined at block 504 that the currently available resources have not changed, the process proceeds to block 520.

At block 520, the currently implemented virtual machine configuration may be maintained. In some embodiments, the VM implementation module 350 may maintain the currently implemented virtual machine configuration. The VM implementation module 350 may transmit a command to each of the resources currently online to maintain their state or may await transmitting any additional commands to the resources until it is determined that the available resources have changed or the desired configuration has changed.

If it is determined at block 504 that the currently available resources have changed, then the process may proceed to block 506. At block 506, the currently available virtual machine resources may be determined. In some embodiments, the VM resource determination module 320 may determine which of the virtual machine resources are currently available and how the resources have changed. For example, it may be determined that NODE-A (VM1-VM4) that is currently being utilized by the current configuration is now unavailable. Additionally, it may be determined that NODE-Z (VM101-VM104) that is currently not being utilized is now available. The process may then proceed to block 508.

At block 508, the currently available virtual machine resources determined at block 506 are compared to the desired configuration received at block 404. In some embodiments, the VM resource comparison module 330 may compare the currently available virtual machine resources determined at block 506 to the VM management configuration received at block 404. The comparison of the resources performed at block 508 is similar to the comparison of the resources described above with respect to block 408. In addition, the specific change in currently available resources may be identified. The process may then proceed to block 508.

At block 510, it may be determined whether the currently available virtual machine resources determined at block 506 satisfy the desired configuration, including the predicate logic, received at block 404 based on the comparison at block 508. In some embodiments, the VM resource comparison module 330 may determine whether the currently available virtual machine resources satisfy the desired configuration based on the change of resources identified at block 508. For example, if it is determined that a resource outside of the implemented configuration has become unavailable or available, then it may be determined that the currently available resources still satisfy the desired confirmation and the proceed may proceed to block 512. Additionally, if it is determined that a resource within the implemented configuration has become unavailable, the process may proceed to block 512 if the desired configuration may be still be satisfied by the available resources (i.e., NODE-Z (VM101-VM104)).

Alternatively, if it is determined that a resource within the implemented configuration has become unavailable and the currently available resources determined at block 506 do not satisfy the desired configuration, it may be determined whether a different set of machines may satisfy the specified configuration. Further, if it is determined that the currently available resources do not satisfy the desired configuration, the process may proceed to block 516. At block 516, the user may be notified via the notification module 370. Upon notification that the currently available virtual machine resources do not satisfy the desired VM management configuration, a user or administrator may then specify an alternate configuration using predicate logic or a specific configuration.

At block 512, the specific virtual machine resources within the available virtual machines needed to satisfy the desired configuration are identified. In some embodiments, the specific virtual machine resources and the configuration of the specific virtual machine resources may be determined by the VM configuration determination module 340. When it is determined at block 510 that a resource outside of the currently implemented configuration has become unavailable, it may be determined that the current implementation is to be maintained.

Additionally, when it is determined at block 510 that a resource outside of the currently implemented configuration has become available, it may be determined that the newly available resource is preferable over the currently utilized resources. As a result, a new configuration utilizing the newly available resource may be determined. Further, if it is determined that a resource within the currently implemented configuration has become unavailable but that the available resources may still satisfy the desired configuration based on the predicate logic, then a new configuration utilizing the presently available resources may be determined. The process may then proceed to block 514.

At block 514, the virtual machine configuration, including the specific virtual machine resources, determined at block 512 may be implemented. In some embodiments, the VM implementation module 350 may implement the determined virtual machine configuration. The implementation of the determined configuration at block 514 is similar to the implementation of the configuration described above with respect to block 414. Each of the above-noted process steps may be implemented for physical machine resources as well as virtual machine resources.

Figure 6:
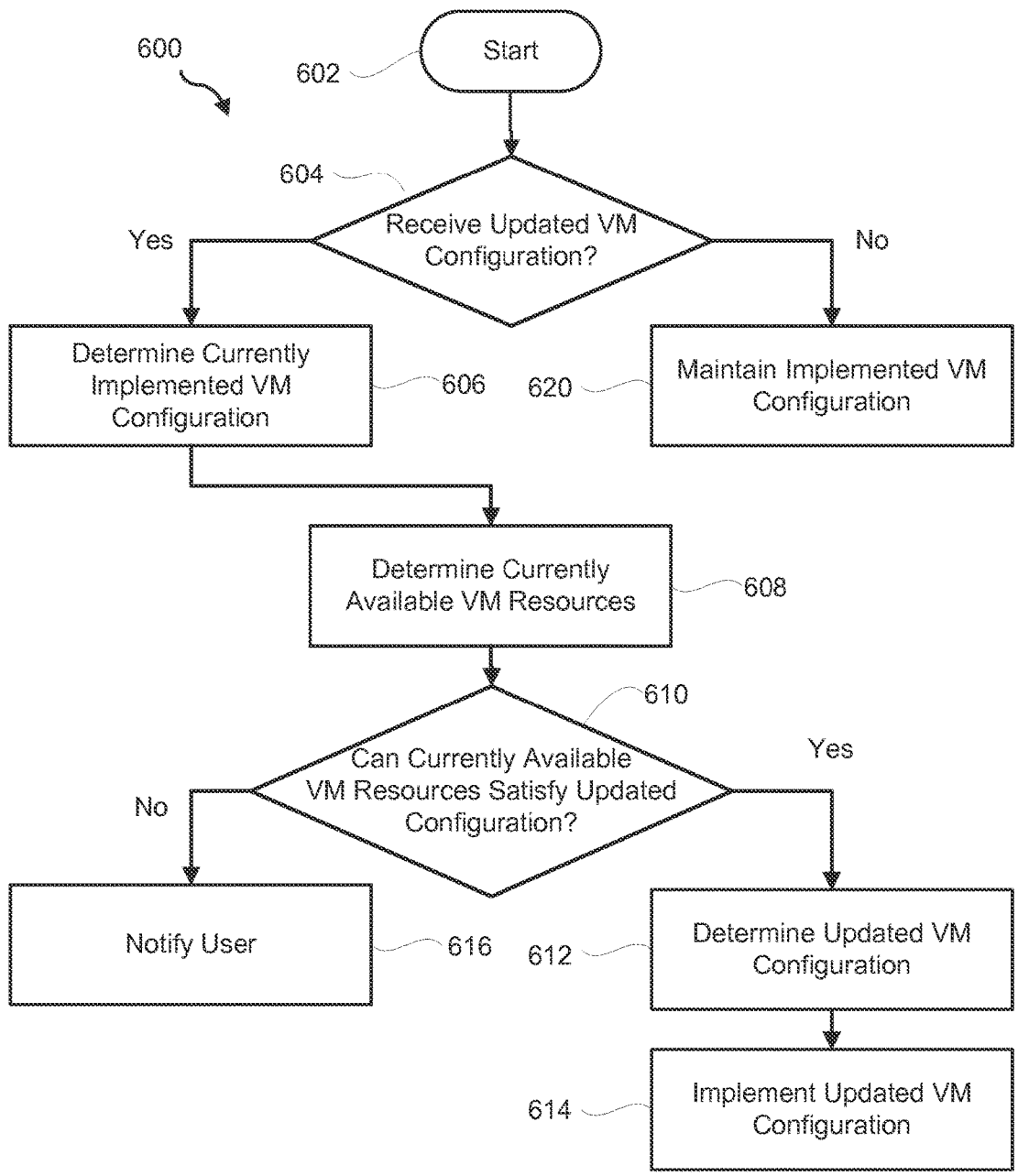
FIG. 6 shows a method for managing virtual machines when a virtual machine configuration changes in accordance with an embodiment of the present disclosure.

FIG. 6 shows a method for managing virtual machines when a virtual machine configuration changes in accordance with an embodiment of the present disclosure. At block 602, the method 600 may begin.

At block 604, it may be determined whether an updated virtual machine configuration has been received. In some embodiments, the updated virtual machine configuration may be received via the VM management configuration reception module 310. The updated configuration may specify different resources to be utilized. For example, the updated configuration may indicate a different predicate logic utilizing a different set of Boolean conditions (e.g., AND, OR, NOR, XOR, etc.) desired by the user or administrator. The reception of the updated configuration at block 604 is similar to the reception of the initial configuration described above with respect to block 404. If it is determined that an updated configuration has not been received, the process may proceed to block 620.

At block 620, the currently implemented virtual machine configuration may be maintained. In some embodiments, the VM implementation module 350 may maintain the currently implemented virtual machine configuration. The maintaining of the current resource configuration at block 620 is similar to the maintaining of the configuration described above with respect to block 520.

Alternatively, if it is determined that an updated configuration has been received at block 604, the process may proceed to block 606. At block 606, the currently implemented configuration may be determined. In some embodiments, the VM configuration determination module 340 may determine the currently implemented configuration. Additionally, it may be determined how the currently implemented configuration is different from the updated configuration received at block 604. For example, it may be determined that the current configuration requires that n number of virtual machines on NODE-A "AND" m number of virtual machines on NODE-B must be online whereas the updated configuration requires that (n number of virtual machines on NODE-A "AND" m number of virtual machines on NODE-B) "OR" (m−5 number of virtual machines on NODE-C) must be online. The proceed may then proceed to block 608.

At block 608, the currently available virtual machine resources may be determined. In some embodiments, the VM resource determination module 320 may determine which of the virtual machine resources are currently available. Additionally, the VM resource monitoring module 360 may determine whether the resources have changed and how the available resources have changed. The determination of the available resources and how the resources have changed at block 608 are similar to the processes of blocks 406 and 506. The process may then proceed to block 610.

At block 610, it may be determined whether the updated configuration received at block 604 may be satisfied by the currently available resources determined at block 608. In some embodiments, the VM resource comparison module 330 may determine whether the currently available virtual machine resources satisfy the updated configuration based on the currently available resources determined at block 608. The determination of whether the currently available resources satisfy the updated configuration at block 610 is similar to the processes of blocks 410 and 510. If it is determined that the currently available resources may not satisfy the updated configuration at block 610, the process may proceed to block 616.

At block 616, the user or administrator may be notified via the notification module 370 that the currently available resources may not satisfy the updated configuration. Upon notification that the currently available virtual machine resources do not satisfy the desired VM management configuration, a user or administrator may then specify an alternate configuration using predicate logic or a specific configuration.

Alternatively, if it is determined at block 610 that the currently available virtual machine resources determined may satisfy the updated VM management configuration received at block 604 then the process may proceed to block 612. At block 612, the specific virtual machine resources within the currently available virtual machines needed to satisfy the updated configuration are identified. In some embodiments, the specific virtual machine resources and the configuration of the specific virtual machine resources may be determined by the VM configuration determination module 340. The determination of the updated virtual machine configuration at block 612 is similar to the determination of the virtual machine configuration at blocks 412 and 512. After the virtual machine configuration has been determined the process may proceed to block 614.

At block 614, the updated virtual machine configuration, including the specific virtual machine resources, determined at block 612 may be implemented. In some embodiments, the VM implementation module 350 may implement the updated virtual machine configuration. The implementation of the updated configuration at block 614 is similar to the implementation of the configuration described above with respect to block 414 and block 514. Furthermore, each of the above steps may be implemented for physical machine resources as well as virtual machine resources.

At this point it should be noted that virtual machine management in accordance with the present disclosure as described above may involve the processing of input data and the generation of output data to some extent. This input data processing and output data generation may be implemented in hardware or software. For example, specific electronic components may be employed in a virtual machine management module or similar or related circuitry for implementing the functions associated with virtual machine management in accordance with the present disclosure as described above. Alternatively, one or more processors operating in accordance with instructions may implement the functions associated with virtual machine management in accordance with the present disclosure as described above. If such is the case, it is within the scope of the present disclosure that such instructions may be stored on one or more non-transitory processor readable storage media (e.g., a magnetic disk or other storage medium), or transmitted to one or more processors via one or more signals embodied in one or more carrier waves.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of at least one particular implementation in at least one particular environment for at least one particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

The invention claimed is:

1. A method for managing computing resources comprising:

receiving a desired resource configuration, wherein the desired resource configuration specifies desired states of a plurality of virtual machines and includes predicate logic to define numbers of needed virtual machines across multiple computing nodes and multiple clusters, the predicate logic including conditions that specify alternative configurations of the numbers of needed virtual machines across the multiple computing nodes and the multiple clusters based on a plurality of Boolean conditions, the alternative configurations satisfying the desired resource configuration;

determining currently available resources, wherein the determined currently available resources include service groups of applications;

determining an interdependency between the service groups;

determining, via at least one computer processor, whether the currently available resources and the interdependency satisfy the desired resource configuration;

determining a resource implementation based on the determination of whether the currently available resources satisfy the desired resource configuration;

implementing the determined resource implementation on a set of resources;

monitoring the currently available resources to determine whether the currently available resources have changed;

identifying specific resources that have changed and aspects of the specific resources that have changed upon determining the currently available resources have changed;

determining whether the specific resources that have changed are within the set of resources, wherein, when at least one of the specific resources that have changed is not within the set of resources, determining whether the at least one of the specific resources is preferred over at least one of the set of resources;

determining whether the specific resources that have changed satisfy the desired resource configuration; and modifying the set of resources based on the determination of whether the at least one of the specific resources is preferred and the determination of whether the specific resources that have changed satisfy the desired resource configuration.

2. The method for managing computing resources of claim 1, further comprising:
notifying a user upon determining that the currently available resources do not satisfy the desired resource configuration.

3. The method for managing computing resources of claim 1, further comprising:
notifying a user upon determining that the specific resources that have changed do not satisfy the desired resource configuration.

4. The method for managing computing resources of claim 1, wherein the desired resource configuration is specified by a user via a user interface.

5. The method for managing computing resources of claim 1, further comprising:
determining whether an updated resource configuration has been received; and
determining whether the currently available resources satisfy the updated resource configuration upon determining the updated resource configuration has been received.

6. The method for managing computing resources of claim 5, further comprising:
notifying a user upon determining that the currently available resources do not satisfy the updated resource configuration.

7. The method for managing computing resources of claim 5, further comprising:
determining an updated resource implementation to satisfy the updated resource configuration.

8. The method for managing computing resources of claim 1, wherein the currently available resources include at least one virtual machine, at least one computing node implementing the plurality of virtual machines, and the applications supported by the plurality of virtual machines.

9. The method for managing computing resources of claim 1, wherein the currently available resources are arranged at a plurality of computing nodes.

10. The method for managing computing resources of claim 9, wherein each of the plurality of virtual machines are within one of a plurality of the service groups and the applications are implemented across the plurality of virtual machines.

11. The method for managing computing resources of claim 1, wherein the Boolean conditions include at least one of: and, or, nor, xor, greater than, and less than.

12. The method for managing computing resources of claim 1, wherein the predicate logic indicates a desired first state for a first plurality of resources and a desired second state for a second plurality of resources.

13. The method for managing computing resources of claim 12, wherein the desired first state is online, the first plurality of resources are within a first computing node, the desired second state is online, and the second plurality of resources are within a second computing node different from the first computing node.

14. At least one non-transitory processor readable storage medium storing a computer program of instructions configured to be readable by at least one processor for instructing the at least one processor to execute a computer process for performing the method as recited in claim 1.

15. The method for managing computing resources of claim 1, wherein the desired resource configuration specifies physical machine resources.

16. The method for managing computing resources of claim 1, wherein the desired resource configuration specifies when predetermined virtual machines are to start or stop.

17. A system for managing computing resources comprising:
one or more processors communicatively coupled to a network and a memory; wherein the one or more processors are configured to:
receive a desired resource configuration, wherein the desired resource configuration specifies desired states of a plurality of virtual machines and includes predicate logic to define numbers of needed virtual machines across multiple computing nodes and multiple clusters, the predicate logic including conditions that specify alternative configurations of the numbers of needed virtual machines across the multiple computing nodes and multiple clusters based on a plurality of Boolean conditions, the alternative configurations satisfying the desired resource configuration;
determine currently available resources, wherein the determined currently available resources include service groups of applications;
determining an interdependency between the service groups;

determine whether the currently available resources and the interdependency satisfy the desired resource configuration;

determine a resource implementation based on the determination of whether the currently available resources satisfy the desired resource configuration;

implement the determined resource implementation on a set of resources;

monitor the currently available resources to determine whether the currently available resources have changed;

identify specific resources that have changed and aspects of the specific resources that have changed upon determining the currently available resources have changed;

determine whether the specific resources that have changed are within the set of resources, wherein, when at least one of the specific resources that have changed is not within the set of resources, determining whether the at least one of the specific resources is preferred over at least one of the set of resources;

determine whether the specific resources that have changed satisfy the desired resource configuration; and modify the set of resources based on the determination of whether the at least one of the specific resources is preferred and the determination of whether the specific resources that have changed satisfy the desired resource configuration.

* * * * *